United States Patent
Prahlad et al.

(10) Patent No.: US 10,783,129 B2
(45) Date of Patent: *Sep. 22, 2020

(54) METHOD AND SYSTEM FOR OFFLINE INDEXING OF CONTENT AND CLASSIFYING STORED DATA

(71) Applicant: Commvault Systems, Inc., Tinton Falls, NJ (US)

(72) Inventors: Anand Prahlad, Bangalore (IN);
Jeremy A. Schwartz, Austin, TX (US);
David Ngo, Shrewsbury, NJ (US);
Brian Brockway, Shrewsbury, NJ (US);
Marcus S. Muller, Maynard, MA (US);
Parag Gokhale, Marlboro, NJ (US);
Rajiv Kottomtharayil, Marlboro, NJ (US)

(73) Assignee: Commvault Systems, Inc., Tinton Falls, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/880,767

(22) Filed: Oct. 12, 2015

(65) Prior Publication Data

US 2016/0034506 A1 Feb. 4, 2016

Related U.S. Application Data

(63) Continuation of application No. 13/461,434, filed on May 1, 2012, now Pat. No. 9,158,835, which is a
(Continued)

(51) Int. Cl.
*G06F 16/22* (2019.01)
*G06F 16/31* (2019.01)
(Continued)

(52) U.S. Cl.
CPC ...... *G06F 16/2228* (2019.01); *G06F 16/2372* (2019.01); *G06F 16/319* (2019.01); *G06F 11/1446* (2013.01); *G06F 2201/84* (2013.01)

(58) Field of Classification Search
CPC ......... G06F 17/30321; G06F 17/30374; G06F 17/30622; G06F 11/1446; G06F 2201/84;
(Continued)

(56) References Cited

U.S. PATENT DOCUMENTS

| | | |
|---|---|---|
| 4,686,620 A | 8/1987 | Ng |
| 4,995,035 A | 2/1991 | Cole et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

"Text Figures", retrieved from http://www.microsoft.com/msj/1198.ntfs/ntfstextfigs.htm on Nov. 10, 2005, 7 pages.

(Continued)

*Primary Examiner* — Mark D Featherstone
*Assistant Examiner* — Faezeh Forouharnejad
(74) *Attorney, Agent, or Firm* — Knobbe Martens Olson & Bear LLP

(57) ABSTRACT

A method and system for creating an index of content without interfering with the source of the content includes an offline content indexing system that creates an index of content from an offline copy of data. The system may associate additional properties or tags with data that are not part of traditional indexing of content, such as the time the content was last available or user attributes associated with
(Continued)

the content. Users can search the created index to locate content that is no longer available or based on the associate attributes.

19 Claims, 5 Drawing Sheets

Related U.S. Application Data continuation of application No. 12/058,487, filed on Mar. 28, 2008, now Pat. No. 8,170,995, which is a continuation of application No. 11/694,869, filed on Mar. 30, 2007, now Pat. No. 7,882,077.

(60) Provisional application No. 60/852,584, filed on Oct. 17, 2006.

(51) Int. Cl.
*G06F 16/23* (2019.01)
*G06F 11/14* (2006.01)

(58) Field of Classification Search
CPC . G06F 16/2228; G06F 16/2372; G06F 16/319
See application file for complete search history.

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,590,318 A | 12/1996 | Zbikowski et al. |
| 5,619,644 A | 4/1997 | Crockett et al. |
| 5,623,679 A | 4/1997 | Rivette et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A | 5/1999 | Bachman et al. |
| 5,918,232 A | 6/1999 | Pouschine et al. |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,006,225 A | 12/1999 | Bowman et al. |
| 6,021,415 A | 2/2000 | Cannon et al. |
| 6,023,710 A | 2/2000 | Steiner et al. |
| 6,026,414 A | 2/2000 | Anglin |
| 6,052,735 A | 4/2000 | Ulrich et al. |
| 6,061,692 A | 5/2000 | Thomas et al. |
| 6,076,148 A | 6/2000 | Kedem |
| 6,088,697 A | 7/2000 | Crockett et al. |
| 6,092,062 A | 7/2000 | Lohman et al. |
| 6,094,416 A | 7/2000 | Ying |
| 6,112,221 A | 8/2000 | Bender et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,189,001 B1 | 2/2001 | McGovern et al. |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,499,026 B1 | 12/2002 | Rivette et al. |
| 6,507,852 B1 | 1/2003 | Dempsey et al. |
| 6,516,314 B1 | 2/2003 | Birkler et al. |
| 6,519,679 B2 | 2/2003 | Devireddy et al. |
| 6,538,669 B1 | 3/2003 | Lee et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,625,623 B1 | 9/2003 | Midgley et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,772,164 B2 | 8/2004 | Reinhardt |
| 6,775,790 B2 | 8/2004 | Reuter et al. |
| 6,785,864 B1 | 8/2004 | Te et al. |
| 6,829,635 B1 | 12/2004 | Townshend |
| 6,834,329 B2 | 12/2004 | Sasaki et al. |
| 6,836,779 B2 | 12/2004 | Poulin |
| 6,847,984 B1 | 1/2005 | Midgley et al. |
| 6,857,053 B2 | 2/2005 | Bolik et al. |
| 6,871,163 B2 | 3/2005 | Hiller et al. |
| 6,886,020 B1 | 4/2005 | Zahavi et al. |
| 6,947,935 B1 | 9/2005 | Horvitz et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,035,880 B1 | 4/2006 | Crescenti et al. |
| 7,047,236 B2 | 5/2006 | Conroy et al. |

(56) References Cited

U.S. PATENT DOCUMENTS

| | | | |
|---|---|---|---|
| 7,085,787 B2 | 8/2006 | Beier et al. | |
| 7,103,740 B1 | 9/2006 | Colgrove et al. | |
| 7,130,860 B2 | 10/2006 | Pachet et al. | |
| 7,130,970 B2 | 10/2006 | Devassy et al. | |
| 7,146,566 B1 | 12/2006 | Hohensee et al. | |
| 7,149,750 B2 | 12/2006 | Chadwick | |
| 7,165,082 B1 | 1/2007 | DeVos | |
| 7,167,895 B1 | 1/2007 | Connelly | |
| 7,171,619 B1* | 1/2007 | Bianco | G06F 17/30997 |
| | | | 707/999.007 |
| 7,181,444 B2 | 2/2007 | Porter et al. | |
| 7,194,454 B2 | 3/2007 | Hansen et al. | |
| 7,197,502 B2 | 3/2007 | Feinsmith | |
| 7,200,726 B1 | 4/2007 | Gole et al. | |
| 7,240,100 B1 | 7/2007 | Wein et al. | |
| 7,246,207 B2 | 7/2007 | Kottomtharayil et al. | |
| 7,246,211 B1 | 7/2007 | Beloussov et al. | |
| 7,266,546 B2* | 9/2007 | Son | G06F 16/955 |
| 7,269,612 B2 | 9/2007 | Devarakonda et al. | |
| 7,272,606 B2 | 9/2007 | Borthakur et al. | |
| 7,328,366 B2 | 2/2008 | Michelman | |
| 7,330,997 B1* | 2/2008 | Odom | G06F 11/1464 |
| | | | 711/162 |
| 7,343,365 B2 | 3/2008 | Farnham et al. | |
| 7,343,394 B2 | 3/2008 | Morreale et al. | |
| 7,346,623 B2 | 3/2008 | Prahlad et al. | |
| 7,346,676 B1 | 3/2008 | Swildens et al. | |
| 7,356,657 B2 | 4/2008 | Mikami | |
| 7,356,660 B2 | 4/2008 | Matsunami et al. | |
| 7,359,917 B2 | 4/2008 | Winter et al. | |
| 7,366,859 B2 | 4/2008 | Per et al. | |
| 7,386,663 B2 | 6/2008 | Cousins | |
| 7,395,282 B1 | 7/2008 | Crescenti et al. | |
| 7,430,587 B2 | 9/2008 | Malone et al. | |
| 7,433,301 B2 | 10/2008 | Akahane et al. | |
| 7,440,966 B2 | 10/2008 | Adkins et al. | |
| 7,440,984 B2 | 10/2008 | Augenstein et al. | |
| 7,454,569 B2 | 11/2008 | Kavuri et al. | |
| 7,496,589 B1 | 2/2009 | Jain et al. | |
| 7,500,150 B2 | 3/2009 | Sharma et al. | |
| 7,509,316 B2 | 3/2009 | Greenblatt et al. | |
| 7,512,601 B2 | 3/2009 | Cucerzan et al. | |
| 7,512,814 B2 | 3/2009 | Chen et al. | |
| 7,529,748 B2 | 5/2009 | Wen et al. | |
| 7,532,340 B2 | 5/2009 | Koppich et al. | |
| 7,533,103 B2 | 5/2009 | Brendle et al. | |
| 7,533,181 B2 | 5/2009 | Dawson et al. | |
| 7,533,230 B2 | 5/2009 | Glover et al. | |
| 7,583,861 B2 | 9/2009 | Hanna et al. | |
| 7,584,227 B2 | 9/2009 | Gokhale et al. | |
| 7,590,997 B2 | 9/2009 | Diaz Perez | |
| 7,613,728 B2 | 11/2009 | Png et al. | |
| 7,613,752 B2 | 11/2009 | Prahlad et al. | |
| 7,617,541 B2 | 11/2009 | Plotkin et al. | |
| 7,620,710 B2 | 11/2009 | Kottomtharayil et al. | |
| 7,624,443 B2 | 11/2009 | Kramer et al. | |
| 7,627,598 B1 | 12/2009 | Burke | |
| 7,627,617 B2 | 12/2009 | Kavuri et al. | |
| 7,631,151 B2 | 12/2009 | Prahlad et al. | |
| 7,634,478 B2 | 12/2009 | Yang et al. | |
| 7,657,550 B2 | 2/2010 | Prahlad et al. | |
| 7,660,800 B2 | 2/2010 | Prahlad et al. | |
| 7,660,807 B2 | 2/2010 | Prahlad et al. | |
| 7,668,798 B2 | 2/2010 | Scanlon et al. | |
| 7,668,884 B2 | 2/2010 | Prahlad et al. | |
| 7,672,962 B2 | 3/2010 | Arrouye et al. | |
| 7,693,856 B2 | 4/2010 | Arrouye et al. | |
| 7,707,178 B2 | 4/2010 | Prahlad et al. | |
| 7,711,700 B2 | 5/2010 | Prahlad et al. | |
| 7,716,171 B2 | 5/2010 | Kryger | |
| 7,716,191 B2 | 5/2010 | Blumenau et al. | |
| 7,720,801 B2 | 5/2010 | Chen | |
| 7,725,605 B2 | 5/2010 | Palmeri et al. | |
| 7,725,671 B2 | 5/2010 | Prahlad et al. | |
| 7,734,593 B2 | 6/2010 | Prahlad et al. | |
| 7,734,669 B2 | 6/2010 | Kottomtharayil et al. | |
| 7,734,715 B2 | 6/2010 | Hyakutake et al. | |
| 7,747,579 B2 | 6/2010 | Prahlad et al. | |
| 7,756,837 B2 | 7/2010 | Williams et al. | |
| 7,801,864 B2 | 9/2010 | Prahlad et al. | |
| 7,809,687 B2 | 10/2010 | Cisler et al. | |
| 7,818,215 B2 | 10/2010 | King et al. | |
| 7,822,749 B2 | 10/2010 | Prahlad et al. | |
| 7,831,553 B2 | 11/2010 | Prahlad et al. | |
| 7,831,622 B2 | 11/2010 | Prahlad et al. | |
| 7,831,795 B2 | 11/2010 | Prahlad et al. | |
| 7,840,537 B2 | 11/2010 | Gokhale et al. | |
| 7,840,619 B2 | 11/2010 | Horn | |
| 7,841,011 B2 | 11/2010 | Manson et al. | |
| 7,849,059 B2 | 12/2010 | Prahlad et al. | |
| 7,882,077 B2 | 2/2011 | Gokhale et al. | |
| 7,882,098 B2 | 2/2011 | Prahlad et al. | |
| 7,890,467 B2 | 2/2011 | Watanabe et al. | |
| 7,890,469 B1 | 2/2011 | Maionchi et al. | |
| 7,925,856 B1 | 4/2011 | Greene | |
| 7,933,920 B2 | 4/2011 | Kojima et al. | |
| 7,937,365 B2 | 5/2011 | Prahlad et al. | |
| 7,937,393 B2 | 5/2011 | Prahlad et al. | |
| 7,962,709 B2 | 6/2011 | Agrawal | |
| 7,966,495 B2 | 6/2011 | Ackerman et al. | |
| 8,010,769 B2 | 8/2011 | Prahlad et al. | |
| 8,037,031 B2 | 10/2011 | Gokhale et al. | |
| 8,041,677 B2 | 10/2011 | Sumner et al. | |
| 8,051,045 B2 | 11/2011 | Vogler | |
| 8,051,095 B2 | 11/2011 | Prahlad et al. | |
| 8,055,650 B2 | 11/2011 | Scanlon et al. | |
| 8,055,745 B2 | 11/2011 | Atluri | |
| 8,086,569 B2 | 12/2011 | Jasrasaria | |
| 8,108,429 B2 | 1/2012 | Sim-Tang | |
| 8,117,196 B2 | 2/2012 | Jones et al. | |
| 8,140,630 B2 | 3/2012 | Jones et al. | |
| 8,140,786 B2 | 3/2012 | Bunte et al. | |
| 8,170,995 B2 | 5/2012 | Prahlad et al. | |
| 8,190,571 B2 | 5/2012 | Sen et al. | |
| 8,219,524 B2 | 7/2012 | Gokhale | |
| 8,229,904 B2 | 7/2012 | Claudatos | |
| 8,229,954 B2 | 7/2012 | Kottomtharayil et al. | |
| 8,234,249 B2 | 7/2012 | Prahlad et al. | |
| 8,271,548 B2 | 9/2012 | Prahlad et al. | |
| 8,285,964 B2 | 10/2012 | Prahlad et al. | |
| 8,339,232 B2 | 12/2012 | Lotfi et al. | |
| 8,612,714 B2 | 1/2013 | Prahlad | |
| 8,370,442 B2 | 2/2013 | Ahn | |
| 8,401,996 B2 | 3/2013 | Muller | |
| 8,442,983 B2 | 5/2013 | Pawar | |
| 8,484,257 B2 | 7/2013 | Borthakur et al. | |
| 8,495,102 B2 | 7/2013 | Fulton | |
| 8,578,120 B2 | 11/2013 | Attarde | |
| 8,595,633 B2 | 11/2013 | Celik | |
| 8,615,523 B2 | 12/2013 | Prahlad | |
| 8,645,349 B2 | 2/2014 | Roark et al. | |
| 8,655,914 B2 | 2/2014 | Prahlad | |
| 8,719,264 B2 | 5/2014 | Varadharajan et al. | |
| 8,738,663 B2 | 5/2014 | Gonzalez et al. | |
| 8,832,406 B2 | 9/2014 | Brockway et al. | |
| 8,880,735 B2 | 11/2014 | Tosey | |
| 9,699,129 B1 | 7/2017 | Nelken et al. | |
| 1,037,267 A1 | 8/2019 | Varadharajan | |
| 2001/0047365 A1 | 11/2001 | Yonaitis | |
| 2002/0049626 A1 | 4/2002 | Mathias et al. | |
| 2002/0069324 A1 | 6/2002 | Gerasimov et al. | |
| 2002/0087550 A1 | 7/2002 | Carlyle et al. | |
| 2002/0118974 A1 | 8/2002 | Ikeda et al. | |
| 2002/0147734 A1 | 10/2002 | Shoup et al. | |
| 2002/0161753 A1 | 10/2002 | Inaba et al. | |
| 2003/0018607 A1 | 1/2003 | Lennon et al. | |
| 2003/0018657 A1* | 1/2003 | Monday | G06F 16/10 |
| 2003/0046313 A1 | 3/2003 | Leung et al. | |
| 2003/0101183 A1 | 5/2003 | Kabra et al. | |
| 2003/0130993 A1 | 7/2003 | Mendelevitch et al. | |
| 2003/0149739 A1 | 8/2003 | Adams et al. | |
| 2003/0182583 A1 | 9/2003 | Turco | |
| 2003/0196052 A1* | 10/2003 | Bolik | G06F 11/1448 |
| | | | 711/162 |

(56) References Cited

U.S. PATENT DOCUMENTS

| | | |
|---|---|---|
| 2004/0015514 A1 | 1/2004 | Melton et al. |
| 2004/0254919 A1 | 12/2004 | Giuseppini |
| 2004/0260678 A1 | 12/2004 | Verbowski et al. |
| 2004/0260973 A1 | 12/2004 | Michelman |
| 2005/0010588 A1 | 1/2005 | Zalewski et al. |
| 2005/0033845 A1 | 2/2005 | Perepa et al. |
| 2005/0050075 A1 | 3/2005 | Okamoto et al. |
| 2005/0055352 A1 | 3/2005 | White et al. |
| 2005/0055386 A1 | 3/2005 | Tosey |
| 2005/0086231 A1 | 4/2005 | Moore |
| 2005/0114381 A1 | 5/2005 | Borthakur et al. |
| 2005/0154695 A1 | 7/2005 | Gonzalez et al. |
| 2005/0166082 A1 | 7/2005 | Williams et al. |
| 2005/0187937 A1 | 8/2005 | Kawabe et al. |
| 2005/0188248 A1 | 8/2005 | O'Brien et al. |
| 2005/0216453 A1 | 9/2005 | Sasaki et al. |
| 2005/0221802 A1 | 10/2005 | Hosono |
| 2005/0228794 A1 | 10/2005 | Navas et al. |
| 2005/0262097 A1 | 11/2005 | Sim-Tang et al. |
| 2006/0004820 A1 | 1/2006 | Claudatos et al. |
| 2006/0015524 A1 | 1/2006 | Gardiner et al. |
| 2006/0047714 A1 | 3/2006 | Anderson et al. |
| 2006/0101285 A1 | 5/2006 | Chen et al. |
| 2006/0173870 A1 | 8/2006 | Erdmenger et al. |
| 2006/0224846 A1 | 10/2006 | Amarendran et al. |
| 2006/0230164 A1 | 10/2006 | Schlimmer et al. |
| 2006/0248055 A1 | 11/2006 | Haslam et al. |
| 2006/0259468 A1 | 11/2006 | Brooks et al. |
| 2006/0259527 A1 | 11/2006 | Devarakonda et al. |
| 2006/0277154 A1* | 12/2006 | Lunt ................ G06F 17/30616 |
| 2007/0033191 A1 | 2/2007 | Hornkvist et al. |
| 2007/0043715 A1* | 2/2007 | Kaushik ........... G06F 17/30864 |
| 2007/0043956 A1 | 2/2007 | El Far et al. |
| 2007/0067304 A1 | 3/2007 | Ives |
| 2007/0100867 A1 | 5/2007 | Celik et al. |
| 2007/0143559 A1 | 6/2007 | Yagawa et al. |
| 2007/0185926 A1 | 8/2007 | Prahlad et al. |
| 2007/0203938 A1 | 8/2007 | Prahlad et al. |
| 2007/0206205 A1 | 9/2007 | Suzuki et al. |
| 2007/0208780 A1* | 9/2007 | Anglin ................ G06F 11/1469 |
| 2007/0282680 A1 | 12/2007 | Davis et al. |
| 2008/0059495 A1 | 3/2008 | Kiessig et al. |
| 2008/0059515 A1 | 3/2008 | Fulton |
| 2008/0071727 A1* | 3/2008 | Nair .................. G06F 17/30115 |
| 2008/0077594 A1 | 3/2008 | Ota |
| 2008/0091747 A1 | 4/2008 | Prahlad et al. |
| 2008/0183662 A1 | 7/2008 | Reed et al. |
| 2008/0228771 A1 | 9/2008 | Prahlad et al. |
| 2009/0106375 A1 | 4/2009 | Carmel et al. |
| 2009/0172333 A1 | 7/2009 | Marcu et al. |
| 2009/0287665 A1 | 11/2009 | Prahlad et al. |
| 2009/0319534 A1 | 12/2009 | Gokhale |
| 2010/0082672 A1 | 4/2010 | Kottomtharayil et al. |
| 2010/0179941 A1 | 7/2010 | Agrawal et al. |
| 2010/0205150 A1 | 8/2010 | Prahlad et al. |
| 2010/0250549 A1 | 9/2010 | Muller et al. |
| 2010/0299490 A1 | 11/2010 | Attarde et al. |
| 2011/0178986 A1 | 7/2011 | Prahlad et al. |
| 2012/0215745 A1 | 8/2012 | Prahlad et al. |
| 2013/0110790 A1 | 5/2013 | Matsumoto et al. |
| 2013/0151640 A1 | 6/2013 | Ahn et al. |
| 2013/0198221 A1 | 8/2013 | Roark et al. |
| 2013/0246485 A1 | 9/2013 | Pawar |
| 2014/0114940 A1 | 4/2014 | Prahlad et al. |
| 2014/0229444 A1 | 8/2014 | Varadharajan et al. |
| 2019/0354510 A1 | 11/2019 | Varadharajan |

FOREIGN PATENT DOCUMENTS

| | | | |
|---|---|---|---|
| EP | 0467546 | A2 | 1/1992 |
| EP | 0774715 | A1 | 5/1997 |
| EP | 0809184 | A1 | 11/1997 |
| EP | 0899662 | A1 | 3/1999 |
| EP | 0981090 | A1 | 2/2000 |
| EP | 1174795 | A1 | 1/2002 |
| EP | 2115634 | | 11/2009 |
| WO | 9412944 | A1 | 6/1994 |
| WO | 9513580 | A1 | 5/1995 |
| WO | 9912098 | A1 | 3/1999 |
| WO | 9914692 | A1 | 3/1999 |
| WO | 0106368 | A1 | 1/2001 |
| WO | 0193537 | A2 | 12/2001 |
| WO | 03060774 | A1 | 7/2003 |
| WO | 2004010375 | A3 | 6/2004 |
| WO | 2004063863 | A2 | 7/2004 |
| WO | 2005055093 | A2 | 6/2005 |
| WO | 2007062254 | A2 | 5/2007 |
| WO | 2007062429 | A2 | 5/2007 |
| WO | 2008049023 | A2 | 4/2008 |

OTHER PUBLICATIONS

"Titus Labs—Announces Document Classification for Microsoft Word" Nov. 3, 2005 (Nov. 3, 2005), XP55034835, available at http://web.archive.org/web/20051126093136/http://www.titus-labs.com/about/DocClassRelease.html, 1 page.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

Bhagwan, R. et al. "Total Recall: System Support for Automated Availability Management," Proceedings of the 1st Conference on Symposium on Networked Systems Design and Implementation, vol. 1, Mar. 3, 2004, XP055057350, Berkeley, CA, 14 pages.

Bowman et al. "Harvest: A Scalable, Customizable Discovery and Access System," Department of Computer Science, University of Colorado—Boulder, Revised Mar. 1995, 29 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, Jun. 12-16, 1994, pp. 124-126.

EMC Corporation, "Today's Choices for Business Continuity," 2004, 12 pages.

Extended European Search Report for European Application No. 06846386.8, dated Dec. 30, 2008, 6 pages.

Extended European Search Report for European Application No. 07844364.5, dated Apr. 19, 2011, 9 pages.

Extended European Search Report for European Application No. 07855337.7, dated Dec. 9, 2010, 6 pages.

Extended European Search Report for European Application No. EP11003795, dated Nov. 21, 2012, 20 pages.

Farley, M., "Storage Network Fundamentals Network Backup: the Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.

Gait, J., "The Optical File Cabinet: A Random-Access File System for Write-Once Optical Disks," *IEEE Computer*, vol. 21, No. 6, pp. 11-22 (Jun. 1988).

Harrison, CDIA Training & Test Preparation Guide 2000, Specialized Solutions, 3 pages.

International Search Report and Written Opinion for International Application No. PCT/US07/81681, dated Oct. 20, 2008, 11 pages.

International Search Report and Written Opinion for International Application No. PCT/US07/81681, dated Nov. 13, 2009, 8 pages.

International Search Report and Written Opinion for International Application No. PCT/US10/62069, dated Mar. 7, 2011, 7 pages.

Jander, M., "Launching Storage-Area Net," Data Communications, US, McGraw Hill, NY, vol. 27, No. 4 (Mar. 21, 1998), pp. 64-72.

(56) References Cited

OTHER PUBLICATIONS

Jeffrey Cooperstein and Jeffrey Richter, "Keeping an Eye on Your NTFS Drives, Part II: Building a Change Journal Application," Microsoft Systems Journal, Oct. 1999, 14 pages.
Jeffrey Cooperstein and Jeffrey Richter, "Keeping an Eye on Your NTFS Drives: the Windows 2000 Change Journal Explained," Microsoft Systems Journal, Sep. 1999, 17 pages.
Jeffrey Richter and Luis Felipe Cabrera, "A File System for the 21st Century: Previewing the Windows NT 5.0 File System," and attached text figures, Microsoft Systems Journal, Nov. 1998, 24 pages.
Karl Langdon and John Merryman, "Data Classification: Getting Started," Storage Magazine, Jul. 2005, 3 pages.
Manber et al., "WebGlimpse—Combining Browsing and Searching," 1997 Usenix Technical Conference, Jan. 1997, 12 pages.
Microsoft Developer Network, "GetFileAttributes," online library article, [accessed on Nov. 10, 2005], 3 pages.
Microsoft Developer Network, "GetFileAttributesEx," online library article, [accessed on Nov. 10, 2005], 2 pages.
Microsoft Developer Network, "Win32_File_Attribute_Data," online library article, [accessed on Nov. 10, 2005], 3 pages.
O'Neill, B., "New Tools to Classify Data," Storage Magazine, Aug. 2005, 4 pages.
Partial International Search Results, dated May 25, 2007, International Application No. PCT/US2006/045556, 2 pages.
Quick Reference Guide for West and EAST [date unknown, but verified as of Sep. 13, 2007], Search and Information Resource Administration, 2 pages.
Rosenblum et al., "The Design and Implementation of a Log-Structured File System," *Operating Systems Review SIGOPS*, vol. 25, No. 5, New York, US, pp. 1-15 (May 1991).
Supplementary European Search Report for European Application No. EP07844364, dated Apr. 19, 2011, 9 pages.
Titus Labs Inc.: Titus LABS Document Classification V1.1 for Microsoft Word—Document Policy Enforcement, available at: <http://web.archive.org/web/20060104112621/www.titus-labs.com/includes/PDF/DocClassDataSheet.pdf>, Nov. 3, 2005, 2 pages.
User's Manual for the Examiners Automated Search Tool (EAST) Jul. 22, 1999, Version 1.0, 179 pages.

\* cited by examiner

| Location | Keywords | User Tags | Application | Available |
|---|---|---|---|---|
| http://portal/budget.xls | Finance, Profit, Loss | Accounting, Confidential | Spreadsheet | Immediate |
| Backup Tape C, Offset 160 | Vacation, France | Personal | Email | 1 hour |
| Offsite Tape X | Project Plan, Schedule | Project X, Cancelled | Presentation | 1 week |
| ... | | | | |

*FIG. 5*

METHOD AND SYSTEM FOR OFFLINE INDEXING OF CONTENT AND CLASSIFYING STORED DATA

CROSS-REFERENCE TO RELATED APPLICATIONS

The present application is a continuation of U.S. patent application Ser. No. 13/461,434, entitled "METHOD AND SYSTEM FOR OFFLINE INDEXING OF CONTENT AND CLASSIFYING STORED DATA," and filed on May 1, 2012, now U.S. Pat. No. 9,158,835, which is a continuation of U.S. patent application Ser. No. 12/058,487, entitled "METHOD AND SYSTEM FOR OFFLINE INDEXING OF CONTENT AND CLASSIFYING STORED DATA," and filed on Mar. 28, 2008, now U.S. Pat. No. 8,170,995, which is a continuation of U.S. patent application Ser. No. 11/694,869, entitled "METHOD AND SYSTEM FOR OFFLINE INDEXING OF CONTENT AND CLASSIFYING STORED DATA," and filed on Mar. 30, 2007, now U.S. Pat. No. 7,882,077, which claims priority to U.S. Provisional Application No. 60/852,584 entitled "METHOD AND SYSTEM FOR COLLABORATIVE SEARCHING," and filed on Oct. 17, 2006, each of which is hereby incorporated by reference.

BACKGROUND

Computer systems contain large amounts of data. This data includes personal data, such as financial data, customer/client/patient contact data, audio/visual data, and much more. Corporate computer systems often contain word processing documents, engineering diagrams, spreadsheets, business strategy presentations, and so on. With the proliferation of computer systems and the ease of creating content, the amount of content in an organization has expanded rapidly. Even small offices often have more information stored than any single employee can know about or locate.

Many organizations have installed content management software that actively searches for files within the organization and creates an index of the information available in each file that can be used to search for and retrieve documents based on a topic. Such content management software generally maintains an index of keywords found within the content, such as words in a document.

Creating a content index generally requires access to all of the computer systems within an organization and can put an unexpected load on already burdened systems. Some organizations defer content indexing until off hours, such as early in the morning to reduce the impact to the availability of systems. However, other operations may compete for system resources during off hours. For example, system backups are also generally scheduled for off hours. Systems may be placed in an unavailable state during times when backups are being performed, called the backup window, to prevent data from changing. For organizations with large amounts of data, any interruption, such as that from content indexing, jeopardizes the ability to complete the backup during the backup window.

Furthermore, traditional content indexing only identifies information that is currently available within the organization, and may be insufficient to find all of the data required by an organization. For example, an organization may be asked to produce files that existed during a past time period in response to a legal discovery request. Emails from five years ago or files that have been deleted or are no longer available except in offsite backup tapes may be required to answer such a request. An organization may be obligated to go through the time consuming task of retrieving all of this content and conducting a manual search for content related to the request.

There is a need for a system that overcomes the above problems, as well as providing additional benefits.

BRIEF DESCRIPTION OF THE DRAWINGS

FIG. 5 illustrates a data structure containing entries of a content index, in one embodiment.

Figure 1:
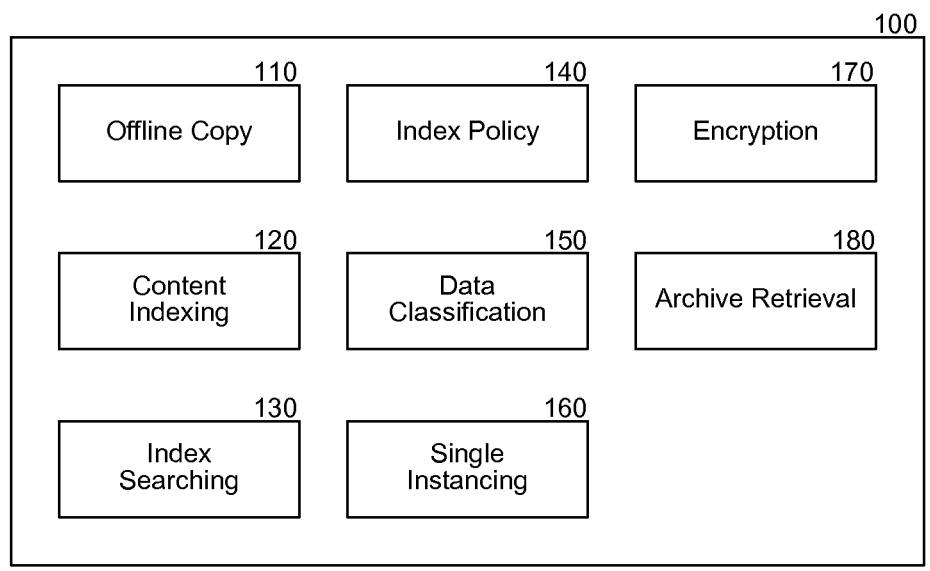
FIG. 1 is a block diagram that illustrates components of a system, in one embodiment of the invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION

Overview

A method and system for creating an index of content without interfering with the source of the content including an offline content indexing system that creates an index of content from an offline copy of data is provided. In general, organizations may have a primary or production copy of source data and one or more offline or secondary copies of data. Secondary copies can be created using various storage operations such as snapshots, backups, replication, migration, and other operations. The offline content indexing system can create an index of an organization's content by examining secondary copies of the organization's data (e.g., backup files generated from routine backups performed by the organization). The offline content indexing system can index content from current secondary copies of the system as well as older offline copies that contain data that may no longer be available on the organization's network. For example, the organization may have secondary copies dating back several years that contain older data that is no longer readily available, but may still be relevant to the organization. The offline content indexing system may associate additional properties with data that are not part of traditional indexing of content, called metadata, such as the time the content was last available or user attributes associated with the content. For example, user attributes such as a project name with which a data file is associated may be stored.

Members of the organization can search the created index to locate content that is no longer readily available or based on the associated attributes. For example, a user can search for content related to a project that was cancelled a year ago. Thus, users can find additional organization data that is not available in traditional content indexing systems. Moreover, by using secondary copies, content indexing does not impact the availability of the system that is the original source of the content.

In some embodiments, members of the organization can search for content within the organization through a single, unified user interface. For example, members may search for content that originated on a variety of computer systems within the organization. Thus, users can access information from many systems within the organization and can search for content independent of the content's original source. Members may also search through multiple copies of the content, such as the original copy, a first secondary backup copy, and other secondary or auxiliary copies of the content.

Various attributes, characteristics, and identifiers (sometimes referred to as tags or data classifications) can be associated with content. The system may define certain built-in tags, such as a document title, author, last modified date, and so on. Users of the system may also define custom tags, or the system may automatically define custom tags. For example, an administrator may add tags related to groups within an enterprise, such as a tag identifying the department (e.g., finance, engineering, or legal) that created a particular content item. Individual users may also add tags relevant to that user. For example, a user might add a descriptive field, such as a programmer adding a check-in description to identify a change made to a version of a source code document. For content that is inherently unstructured or appears random outside of its intended purpose, tags are an especially effective way of ensuring that a user can later find the content. For example, United States Geological Survey (USGS) data is composed of many numbers in a file that have little significance outside of the context of a map or other associated viewer for the data. Tags allow descriptive attributes or other meaningful information to be associated with the data, for example, so that a searching user can know at a glance that particular USGS data refers to a topological map of a nearby lake. Tags may be associated with offline and online data through a metabase or other suitable data structure that stores metadata and references to the content to which the metadata applies. FIG. 5, discussed below, describes one exemplary data structure used to store user tags associated with content.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Creation of an Offline Copy

As discussed above, the offline content indexing system may create a secondary copy, such as an offline copy, as part of an existing backup schedule performed by an organization. For example, an organization may perform weekly backups that contain a complete copy of the organization's data. It is generally not necessary for the offline content indexing system to consume any further resources of the computer systems within the organization that contain source content, since all of the needed data is typically available in the backup data files. The offline content indexing system may restore the backed up data to an intermediate computer system that is not critical to the operation of the organization, or may operate on the backup data files directly to identify and index content. The offline content indexing system may also create the offline copy using copies of data other than a traditional backup, such as a snapshot, primary copy, secondary copy, auxiliary copy, and so on.

In some embodiments, the offline content indexing system uses a change journal to create an offline copy of content. Modern operating systems often contain built in change journaling functionality that stores a journal entry whenever data is changed within a computer system. The change journal generally contains a step-by-step, sequential, or ordered log of what data changed and how the data changed that can be processed at a later time to recreate the current state of the data. The change journal may be used in conjunction with a full data backup or other data protection mechanisms. The full backup can be used to establish the state of the data at a prior point-in-time, and then the change journal entries can be used to update the state with subsequent changes.

In some embodiments, the offline content indexing system or other system uses a data snapshot to create an offline copy of content. Newer operating systems and several data storage companies offer snapshot software capable of taking a snapshot of the content currently on a computer system with minimal impact to the availability of the system. For example, the snapshot may simply note the current entry in a change journal, and keep track of subsequent change journal entries for updating the snapshot. These snapshots can be transferred from the host system and read on another, less critical system or can be used to replicate the data to a different. The offline content indexing system can then access this intermediate system to identify content and perform content indexing. Other technologies that will be recognized by those skilled in the art, such as disk imaging, mirroring, incremental backups, and so on, may be used in a manner similar to create an offline copy of data for content indexing.

In some embodiments, the offline content indexing system selects an offline copy of data for indexing among several available offline copies. For example, an organization may have several copies of data available on different types of media. The same data may be available on a tape, on a backup server, through network attached storage, or on fast mounted disk media. The offline content indexing system may take into consideration factors such as the access time of a particular media and the scheduled load on a particular offline copy when selecting a copy to use for indexing. For example, an offline copy stored on a hard drive may be preferred over a copy stored on tape due to the faster access time of the hard drive copy and the ability to randomly seek among the data rather than accessing the data sequentially. Alternatively or additionally, a backup server storing or responsible for otherwise desirable data to index scheduled to perform an intensive operation such as encrypting content may be skipped in favor of using a different server responsible for an offline copy that is not expected to be needed by other systems during the time expected to index the content. Similarly, the offline content indexing system may prefer an unencrypted offline copy over an encrypted one due to the extra effort required to decrypt the content to index it.

Indexing of Content

In some embodiments, the offline content indexing system may wait to index content until a request related to the content is received. Searches for offline content may not be as time sensitive as searches for currently available content such that the effort of indexing the content can be postponed until the content is required. For example, in a legal discovery request there may be several days or even weeks available to find content responsive to the request, such that indexing before a request is received would unnecessarily burden an organization's systems.

In some embodiments, the offline content indexing system may postpone content indexing until other storage operations have been performed. For example, one storage operation, called single instancing, may reduce or eliminate redundant files contained in backup data caused by many systems containing the same operating system or application files. By postponing content indexing until after single instancing has occurred, the offline content indexing system does not have to search as much data and may complete the indexing process sooner and with less burden to the organization's systems. A storage policy or other system parameter setting or preference may define how and when content indexing is done, and what other operations are performed before and after content indexing (e.g., indexing content after single instancing). A storage policy is a data structure that stores information about the parameters of a storage operation. For example, the storage policy may define that only some content is to be indexed, or that content indexing should occur late at night when system resources are more readily available.

In some embodiments, the offline content indexing system may update a content index according to an indexing policy. An indexing policy is a data structure that stores information about the parameters of an indexing operation. For example, an organization may create a full backup once a week, and may create an indexing policy that specifies that the index should be updated following each weekly full backup. Indexing the full backup creates a reference copy that the organization can store according to legal requirements (e.g., ten years) to respond to any compliance requests. The indexing policy may also specify that incremental updates are performed on the index based on incremental backups or other incremental data protection operations such as updates from a change journal or snapshot application. For example, incremental backups may be created that only specify the data that has changed since the last full backup, and content changes identified within the incremental backup may be used by the offline content indexing system to update the index to reflect the new state of the content. If the backup data indicates that content has been deleted, the indexed content may be retained, but may be flagged or otherwise identified as having been deleted.

Content Tags

In some embodiments, the offline content indexing system tags or otherwise identifies indexed content with additional information that may help identify the information, for example, in a search for content. For example, indexed content may be tagged with the location of the offline copy in which the information was found, such as a particular backup tape or other offline media. The system may also tag online content, such as tagging a new file with the name of its author. If the content is later deleted, the indexed content may be tagged with the date the content was deleted, the user or process that deleted the content, or the date the content was last available. Deleted content may later be restored, and the indexed content may be identified by a version number to indicate versions of the content that have been available on computing systems throughout the content's history. Other information about the content's availability may also be stored, such as whether the content is stored onsite or is archived offsite, and an estimate of the time required to retrieve the content. For example, if the content is stored offsite with an external archival company, the company may require one week's notice to retrieve the content, whereas if the content is stored on a tape within the organization, the content may be available within an hour. Other factors may also be used to provide a more accurate estimate, such as the size of the content, the offset of the content if it is on tape, and so on. During a search, the search results may indicate whether the time required to retrieve certain content would exceed a retrieval threshold. The system may also prohibit transferring content beyond a given retrieval time to ensure compliance with a policy of the organization.

In some embodiments, the offline content indexing system tags content with classifications. For example, the offline content indexing system may classify content based on the type of application typically used to process the content, such as a word processor for documents or an email client for email. Alternatively or additionally, content may be classified based on the department within the organization that generated the content, such as marketing or engineering, or based on a project that the content is associated with such as a particular case within a law firm. Content may also be classified based on access rules associated with the content. For example, some files may be classified as confidential or as only being accessible to a certain group of people within the organization. The system may identify keywords within the content and classify the content automatically based on identified keywords or other aspects of the content.

Searching

In some embodiments, the offline content indexing system searches for content based on temporal information related to the content. For example, a user may search for content available during a specified time period, such as email received during a particular month. A user may also search specifically for content that is no longer available, such as searching for files deleted from the user's primary computer system. The user may perform a search based on the attributes described above, such as a search based on the time an item was deleted, or based on a project that the item was associated with. A user may also search based on keywords associated with user attributes, such as searching for files that only an executive of the organization would have access to, searching for files accessed by a particular user, or searching for files tagged as confidential.

In some embodiments, the offline content indexing system provides search results that predict the availability of content. For example, content stored offsite may need to be located, shipped, and then loaded back into the organization's systems before it is accessible. The offline content indexing system may provide a time estimate of how soon the content could be available for searching as well as providing limited information about the content immediately based on data stored in the index. For example, the content indexing system may maintain a database of hardware and libraries of media available with the organization, as well as the current location of each of these items such that an estimate can be generated for retrieving the hardware or libraries of media. For example, certain tape libraries may be stored offsite after a specified period of time, and content stored within the tape library may take longer to retrieve than content in a tape library stored onsite in the organization. Similarly, the offline content index system may estimate that data stored on tape will take slightly longer to retrieve than data that is available through magnetic storage over the network.

FIGURES

Unless described otherwise below, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 (or other embodiments or Figures) based on the detailed description provided herein.

FIG. 1 is a block diagram that illustrates components of the system, in one embodiment. The offline content indexing system 100 contains an offline copy component 110, a content indexing component 120, an index searching component 130, an index policy component 140, a data classification component 150, a single instancing component 160, an encryption component 170, and an archive retrieval component 180. The offline copy component 110 creates and identifies offline or other secondary copies of data, such as backup data, snapshots, and change journal entries. The content indexing component 120 creates and updates a content index based on offline copies of data. The index searching component 130 searches the index based on user requests to identify target content. The index policy component 140 specifies a schedule for updating the content index incrementally or refreshing the content index, such as from a full weekly backup. The data classification component 150 adds data classifications to the content index based on various classifications of the data, such as the department that created the data, and access information associated with the data. The single instancing component 160 eliminates redundant instances of information from offline copies of data to reduce the work involved in creating an index of the offline copy of the data. The encryption component 170 encrypts and decrypts data as required to permit access to the data for content indexing. The archive retrieval component 180 retrieves archived content from offsite storage, tape libraries, and other archival locations based on requests to access the content and may also provide estimates of the time required to access a particular content item.

FIG. 1 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Figure 2:
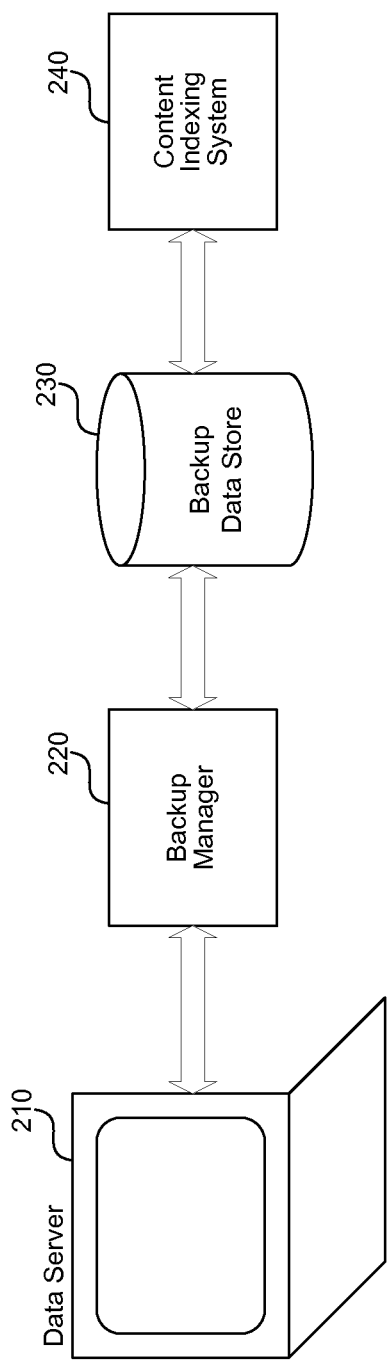
FIG. 2 is a block diagram that illustrates flow of data through the system, in one embodiment.

FIG. 2 is a block diagram that illustrates the flow of data through the system 100, in one embodiment. Content is initially stored on a data server 210 that may be a user computer, data warehouse server, or other information store accessible via a network. The data is accessed by a backup manager 220 to perform a regular backup of the data. The backup manager 220 may be contained within the data server 210 or may be a separate component as shown. For example, the backup manager 220 may be part of a server dedicated to managing backup or other storage operations. Backup data is stored in a backup data store 230 such as a network attached storage device, backup server, tape library, or data silo. The content indexing system 240 accesses data from the backup data store 230 to perform the functions described above. As illustrated in the diagram, because the content indexing system 240 works with an offline copy of the data, the original data server 210 is not negatively impacted by the operations of the content indexing system 240.

Figure 3:
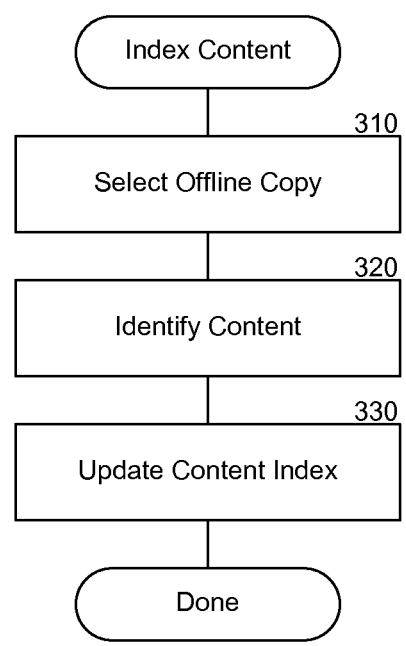
FIG. 3 is a flow diagram that illustrates processing of a content indexing component of the system, in one embodiment.
Figure 4:
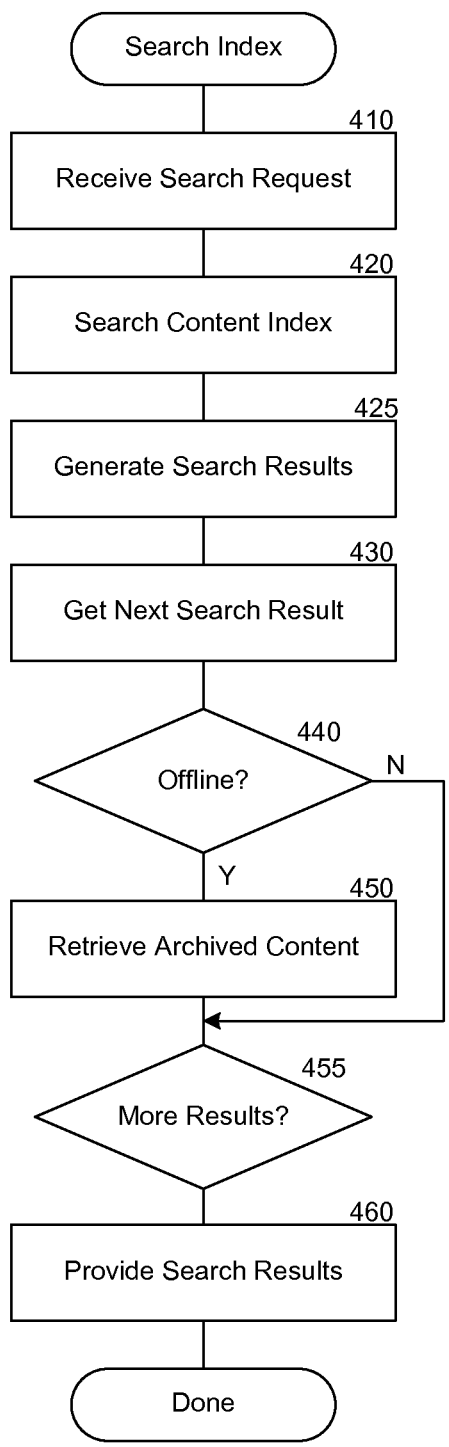
FIG. 4 is a flow diagram that illustrates processing of an index searching component of the system, in one embodiment.

FIGS. 3-4 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 3 is a flow diagram that illustrates the processing of the content indexing component 120 of the system 100, in one embodiment. The component is invoked when new content is available or additional content is ready to be added to the content index. In step 310, the component selects an offline copy of the data to be indexed. For example, the offline copy may be a backup of the data or a data snapshot. In step 320, the component identifies content within the offline copy of the data. For example, the component may identify data files such as word processing documents, spreadsheets, and presentation slides within a backup data file. In step 330, the component updates an index of content to make the content available for searching. The component may parse, process, and store the information. For example, the component may add information such as the location of the content, keywords found within the content, and other supplemental information about the content that may be helpful for locating the content during a search. After step 330, these steps conclude.

FIG. 4 is a flow diagram that illustrates the processing of the index searching component 130 of the system 100, in one embodiment. In step 410, the component receives a search request specifying criteria for finding matching target content. For example, the search request may specify one or more keywords that will be found in matching documents. The search request may also specify boolean operators, regular expressions, and other common search specifications to identify relationships and precedence between terms within the search query. In step 420, the component searches the content index to identify matching content items that are added to a set of search results. For example, the component may identify documents containing specified keywords or other criteria and add these to a list of search results. In step 425, the component generates search results based on the content identified in the content index. In step 430, the component selects the first search result. In decision step 440, if the search result indicates that the identified content is offline, then the component continues at step 450, else the component continues at step 455. For example, the content may be offline because it is on a tape that has been sent to an offsite storage location. In step 450, the component retrieves the archived content. Additionally or alternatively, the component may provide an estimate of the time required to retrieve the archived content and add this information to the selected search result. In decision step 455, if there are more search results, then the component loops to step 430 to get the next search results, else the component continues at step 460. In step 460, the component provides the search results in response to the search query. For example, the user may receive the search results through a web page that lists the search results or the search results may be provided to another component for additional processing through an application programming interface (API). The component may also perform additional processing of the search results before presenting the search results to the user. For example, the component may order the search results, rank them by retrieval time, and so forth. After step 460, these steps conclude.

FIG. 5 illustrates some of the data structures used by the system. While the term "field" and "record" are used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

FIG. 5 illustrates a data structure containing entries of the content index, in one embodiment. The offline content indexing system uses this and similar data structures to provide more intelligent content indexing. For example, the offline content indexing system may index multiple copies of data and data available from the multiple copies using a secondary copy of data stored on media with a higher availability based on the location or other attributes indicated by the data structure described below. As another example, the offline content indexing system may prefer an unencrypted copy of the data to an encrypted copy to avoid wasting time unnecessarily decrypting the data. The table 500 contains a location column 510, a keywords column 520, a user tags column 530, an application column 540, and an available column 550. The table 500 contains three sample entries. The first entry 560 specifies a location to a file on the corporate intranet using a web universal resource locator (URL). The entry 560 contains keywords "finance," "profit," and "loss" that identify content within the file. The entry 560 contains tags added by a user that specify that the content comes from the accounting department and is confidential. The entry 560 indicates that a spreadsheet program typically consumes the content, and that the entry is immediately available. Another entry 570 specifies data stored on a local tape that is a personal email, and can be available in about an hour. Another entry 580 specifies an offsite tape that is a presentation related to a cancelled project. The entry 580 refers to offsite data that is available within one week due to the delay of retrieving the archived data from the offsite location.

CONCLUSION

From the foregoing, it will be appreciated that specific embodiments of the offline content indexing system have been described herein for purposes of illustration, but that various modifications may be made without deviating from the spirit and scope of the invention. For example, web pages are often unavailable and their content may change such that the offline content indexing system could be used to retrieve point in time copies of the content useful for conducting historical analysis. As another example, although files have been described, other types of content such as user settings, application data, emails, and other data objects can all be indexed by the system. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method performed by a storage management system residing within a private computer network for indexing content, the method comprising:
    identifying an offline copy of a production copy of data files created at a production server of the private computer network,
        wherein the offline copy includes one or more data files each having keywords and metadata,
        wherein the data files are copies of one or more data files of the production copy, and
        wherein the offline copy of the one or more data files is stored in one or more secondary storage devices associated with the storage management system that are unavailable to and inaccessible by devices on the private computer network;
    accessing the identified offline copy by an intermediate server that is different from the production data server; and
    at the intermediate server:
        restoring the offline copy to the intermediate server to analyze content within the offline copy;
        identifying keywords from content within the one or more data files of the offline copy on the intermediate server;
        creating a content index of the keywords identified from the content within the one or more data files of the offline copy on the intermediate server; and
        updating the content index by associating the one or more data files of the offline copy with the data files of the production copy.

2. The method of claim 1, wherein creating or updating the content index comprises determining a state of data protection of the identified keywords.

3. The method of claim 1, wherein creating or updating the content index comprises determining whether the identified keywords are encrypted.

4. The method of claim 1, wherein creating or updating the content index comprises determining whether the identified keywords have associated access control information.

5. The method of claim 1, wherein creating or updating the content index comprises determining at least a portion of a topology of a network in which the identified keywords is stored.

6. The method of claim 1, wherein creating or updating the content index comprises determining whether the identified keywords contain one or more specified text strings or words.

7. The method of claim 1, wherein the identifying an offline copy includes identifying a copy to use from among multiple offline copies based on a time required to access each of the multiple offline copies.

8. The method of claim 1, wherein the identifying of the keywords is performed without use of the production server and without accessing the production copy.

9. The method of claim 1, wherein the content index classifies the identified keywords based on at least one or more user-defined classifications that include administratively defined groups within an organization or organization departments associated with the storage management system.

10. The method of claim 1, wherein the creating of the content index is performed without affecting the production server.

11. The method of claim 1, wherein the intermediate server is distinct from a data server that performed one or more data storage operations to store the offline copy to the one or more secondary storage devices.

12. A computer system for indexing and searching multiple data files stored within secondary storage media associated with a storage management system, the computer system comprising:
    a processor;
    a memory;
    an offline copy component that:
        selects a secondary copy of the multiple data files stored within the secondary storage media,
            wherein the secondary copy is offline to and inaccessible by a data server of the storage management system that performed one or more data storage operations to store the secondary copy within the secondary storage media,
            wherein the offline copy component is distinct from the data server, and
        restores the offline secondary copy of the multiple data files from the secondary storage media to analyze content of the offline secondary copy;

a content indexing component that, for at least some of the multiple data files included in the restored offline secondary copy, generates a content index by:
 analyzing content of the multiple data files restored by the offline copy component, and
 updating the content index based on the analysis of the content of the multiple data files; and
an index searching component configured to query the content index to identify one or more indexed content items that satisfy a received search query.

13. The system of claim 12, wherein the index searching component provides an availability criterion for at least some of the identified one or more indexed content items,
 wherein the availability is based upon a location of the identified one or more indexed content items, and
 wherein the availability includes an indication of a time required to access the identified one or more indexed content items based upon the availability.

14. The system of claim 12, further comprising:
 an encryption component configured to decrypt encrypted content.

15. The system of claim 12, wherein the content indexing component is further configured to generate or update the content index based on an indexing policy.

16. The system of claim 12, further comprising:
 a data classification component configured to classify content and add classifications associated with the content to the content index.

17. The system of claim 12, wherein the content indexing component is further configured to select a secondary copy of the multiple data files from among multiple secondary copies of the multiple data files based on time required to access each of the multiple secondary copies of the multiple data files.

18. A method performed by a storage management system, the method comprising:
 accessing an offline copy of data that is stored in one or more offline secondary storage devices of the storage management system,
  wherein the offline copy is a secondary copy of a primary copy of data stored at a production server associated with the storage management system,
  wherein the offline copy is not available to the production server associated with the storage management system, and
  wherein accessing an offline copy of data that is stored in one or more secondary storage devices of the storage management system includes restoring the offline copy of data to an intermediate server that is distinct from the production server and from a data server that performed one or more data storage operations to store the offline copy to the one or more secondary storage devices; and
 analyzing content of the offline copy of data stored in the one or more secondary storage devices to generate a searchable content index of the content within the offline copy of data stored in the one or more secondary storage devices.

19. The method of claim 18, wherein accessing an offline copy of data that is stored in one or more secondary storage devices of the storage management system includes accessing backup data files or snapshots of the primary copy of data stored to the one or more secondary storage devices during previous data storage operations.

* * * * *